United States Patent
Fitzgerald

(10) Patent No.: US 6,173,842 B1
(45) Date of Patent: Jan. 16, 2001

(54) MULTI-WEEDER RACK FOR TRUCKS/TRAILERS

(76) Inventor: William S. Fitzgerald, 304 Harpeth Hills Dr., Franklin, TN (US) 37069

(*) Notice: Under 35 U.S.C. 154(b), the term of this patent shall be extended for 0 days.

(21) Appl. No.: 09/318,846

(22) Filed: May 26, 1999

(51) Int. Cl.⁷ .................... E05B 73/00; A47F 7/00
(52) U.S. Cl. .................. 211/4; 211/70.6; 224/324; 224/567; 224/570; 224/571
(58) Field of Search ................ 211/4, 70.6, 208; 224/324, 567, 570, 571; 482/94, 103, 104, 98, 97, 101, 9, 135

(56) References Cited

U.S. PATENT DOCUMENTS

| | | |
|---|---|---|
| 1,291,430 | 1/1919 | Davenport . |
| 2,088,741 * | 8/1937 | Hanson ............................ 211/208 X |
| 2,946,452 | 7/1960 | Caloiero . |
| 3,326,385 * | 6/1967 | Pinkerton et al. .................... 211/4 |
| 3,438,506 | 4/1969 | Groth . |
| 3,767,093 | 10/1973 | Pinkerton et al. .................. 224/1 R |
| 4,027,798 | 6/1977 | Swaim ................................... 211/4 |
| 4,132,315 | 1/1979 | Young ................................... 211/4 |
| 4,139,100 * | 2/1979 | Reed ..................................... 211/4 |
| 4,249,726 * | 2/1981 | Faust .................................. 482/94 |
| 4,316,608 * | 2/1982 | Lundberg ............................ 482/98 |
| 4,535,985 * | 8/1985 | Mask ............................. 482/135 X |
| 4,696,405 | 9/1987 | Waring ................................ 211/4 |
| 4,730,828 * | 3/1988 | Lane ................................... 482/94 |
| 5,050,868 * | 9/1991 | Pearson ............................. 482/101 |
| 5,143,228 | 9/1992 | Arnold ............................. 211/70.6 |
| 5,303,858 * | 4/1994 | Price ........................... 224/42.45 R |
| 5,411,191 | 5/1995 | Bunn, Jr. ...................... 224/42.45 R |
| 5,647,489 | 7/1997 | Bellis, Jr. ........................ 211/70.6 |
| 5,676,257 * | 10/1997 | Adkins .................................. 211/4 |
| 5,762,590 * | 6/1998 | St. Fleur et al. .................. 482/97 |

FOREIGN PATENT DOCUMENTS 654127  2/1937  (DE) .

* cited by examiner

Primary Examiner—Daniel P. Stodola
Assistant Examiner—Khoa Tran
(74) Attorney, Agent, or Firm—Richard C. Litman

(57) ABSTRACT

A single-lock, multi-weeder rack for storing and securing weedeaters. The multi-weeder rack can be installed on a truck, a trailer, or in any suitable location. The multi-weeder rack has a rectangular frame with side brackets for each weedeater. The rectangular frame of the multi-weeder rack comprises an inner and outer frame made of welded steel. The inner and outer frames of the multi-weeder are slidably engaged, with the outer frame capable of vertical movement relative to the inner frame which is stationary.

3 Claims, 8 Drawing Sheets

MULTI-WEEDER RACK FOR TRUCKS/TRAILERS

BACKGROUND OF THE INVENTION

1. Field of the Invention

The present invention relates generally to racks, and more particularly, to a tool rack that can securely hold several weedeaters. Preferably, the multiple weedeater rack of the present invention is mounted on a truck or trailer, however, the multiple weedeater rack can be placed in any suitable location.

2. Description of the Related Art

Weed cutting devices, also known as weeders or "weedeaters", as well as other lawn maintenance equipment are typically transported from one site to another site on a frequent basis. Often the lawn maintenance equipment is damaged because the equipment is not secured within the vehicle and therefore, the equipment is free to be tossed around as the vehicle moves. The damage to the equipment caused by the equipment being thrown around inside the vehicle due to the motion of the vehicle can be costly, for example, there are repair costs, replacement costs, and loss revenue due to a diminished workforce because there is less equipment to use. Therefore, it would be advantageous to have a lawn maintenance equipment storage rack that could be mounted in an appropriate location on a vehicle and onto which elongated, tubular equipment like weedeaters could be stored for transport.

Unsecured lawn maintenance equipment like weedeaters can be easily stolen, therefore, it is important to have a convenient means to both readily store and secure such equipment. Any securement means used to secure an elongated, tubular piece of lawn maintenance equipment such as string trimmer should be relatively easy to open and close, and should effectively prevent the unauthorized removal of a piece of equipment.

U.S. Pat. No. 1,291,430 issued on Jan. 14, 1919 to H. F. Davenport, U.S. Pat. No. 2,946,452 issued on Jul. 26, 1960 to J. Caloiero et al, U.S. Pat. No. 3,438,506 issued on Apr. 15, 1969 to G. L. Groth, U.S. Pat. No. 3,767,093 issued on Oct. 23, 1973 to M. L. Pinkerton et al., U.S. Pat. No. 4,027,798 issued on Jun. 7, 1977 to G. C. Swaim, U.S. Pat. No. 4,132,315 issued on Jan. 2, 1979 to B. Y. Young, U.S. Pat. No. 4,696,405 issued on Sep. 29, 1987 to P. M. Waring, U.S. Pat. No. 5,143,228 issued on Sep. 1, 1992 to W. D. Arnold, U.S. Pat. No. 5,411,191 issued on May 2, 1995 to R. Bunn, Jr, U.S. Pat. No. 5,647,489 issued on Jul. 15, 1997, and German Pat. No. 654,127 published in February, 1937 describe rack assemblies used to store a variety of items.

None of the above inventions and patents, taken either singularly or in combination, is seen to describe the instant invention as claimed.

SUMMARY OF THE INVENTION

Accordingly, it is a principal object of the invention to provide a lawn maintenance equipment rack that is easy to open and closed.

It is another object of the invention to provide a lawn maintenance equipment that sturdy and durable.

It is a further object of the invention to provide a lawn maintenance equipment rack that can readily store and secure a multiple number of weedeaters.

Still another object of the invention is to provide a lawn maintenance equipment rack that has multiple security features to prevent the unauthorized removal of equipment.

It is an object of the invention to provide improved elements and arrangements thereof in a lawn maintenance equipment rack for the purposes described which is inexpensive, dependable and fully effective in accomplishing its intended purposes.

To meet the above objectives, the present invention provides for a multi-weeder rack comprising a rectangular frame with side brackets for each weeder. The rectangular frame of the multiweeder rack comprises an inner and outer frame made of welded steel. The inner and outer frames of the multi-weeder are slidably engaged, with the outer frame capable of vertical movement relative to the inner frame which is stationary.

The multi-weeder rack of the present invention has a handle mechanism with an open position for inserting and removing a weeder, and a closed position for securing the weeders in place. A pair of hooks supports each weeder and a locking pin associated with each hook prevents the weeder from being removed from inside the hook when the handle mechanism is in the closed position. When the handle mechanism is in the open position, the locking pin is vertically displaced from the mouth of the hook to a distance sufficient to allow easy insertion or removal of a weeder.

The multi-weeder rack has security pins that prevent the removal of the outer frame of the rack from the inner frame of the rack. Furthermore, the multi-weeder rack has two configured portions, one on the inner frame and the second on the outer frame, that when aligned allow for the installation of a padlock to prevent the multi-weeder rack from being opened by the handle mechanism.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
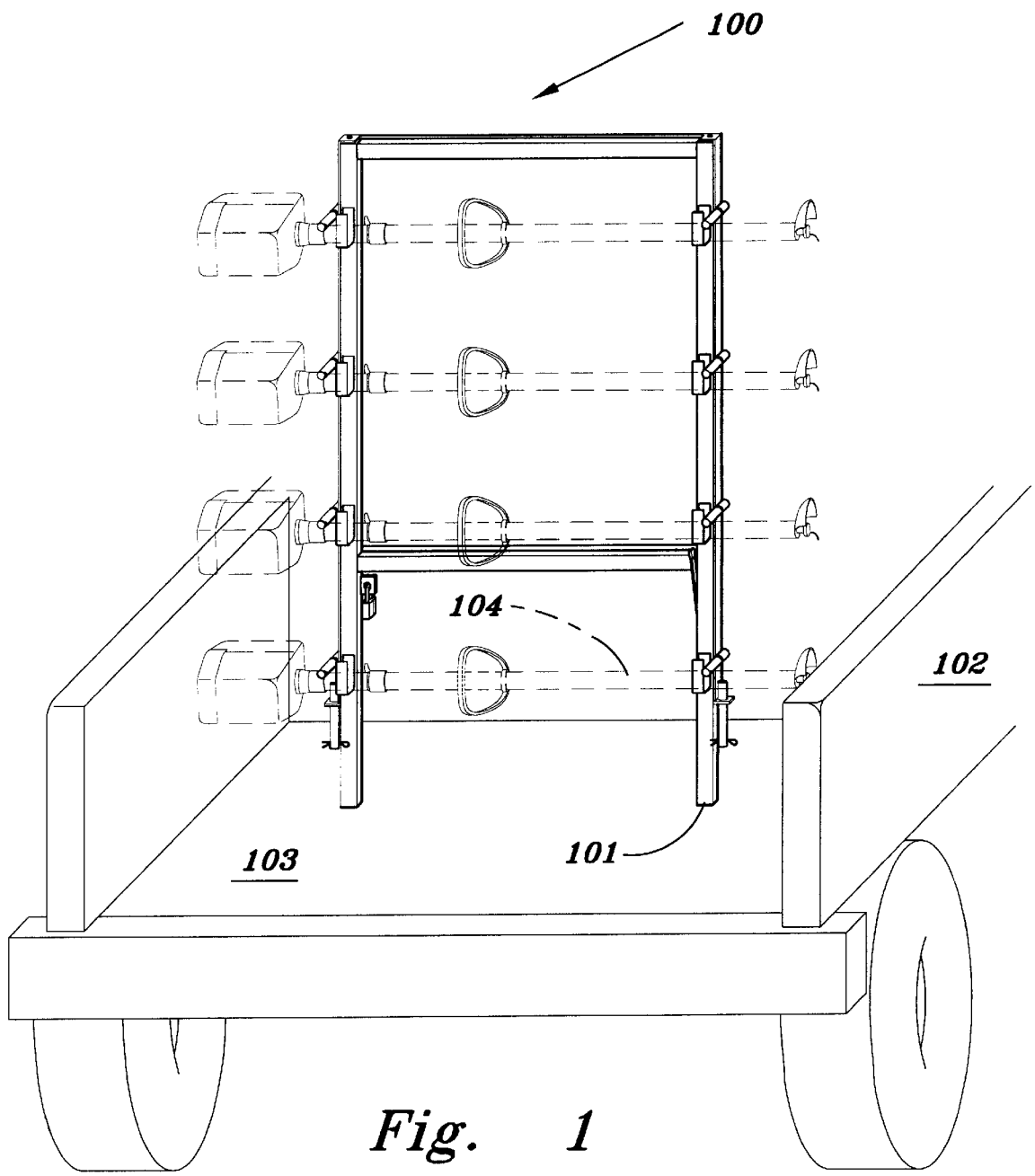
FIG. 1 is an environmental, perspective view of multi-weeder rack installed in a truck according to the present invention.

Shown in FIG. 1 is an environmental, perspective view of the multi-weeder rack 100 of the present invention installed in a truck 102. In a preferred embodiment, the legs 101 of the multi-weeder rack 100 are welded to the floor 103 of the truck 102. However, any suitable mounting means can be used to mount the multi-weeder rack 100 of the present invention.

Figure 2:
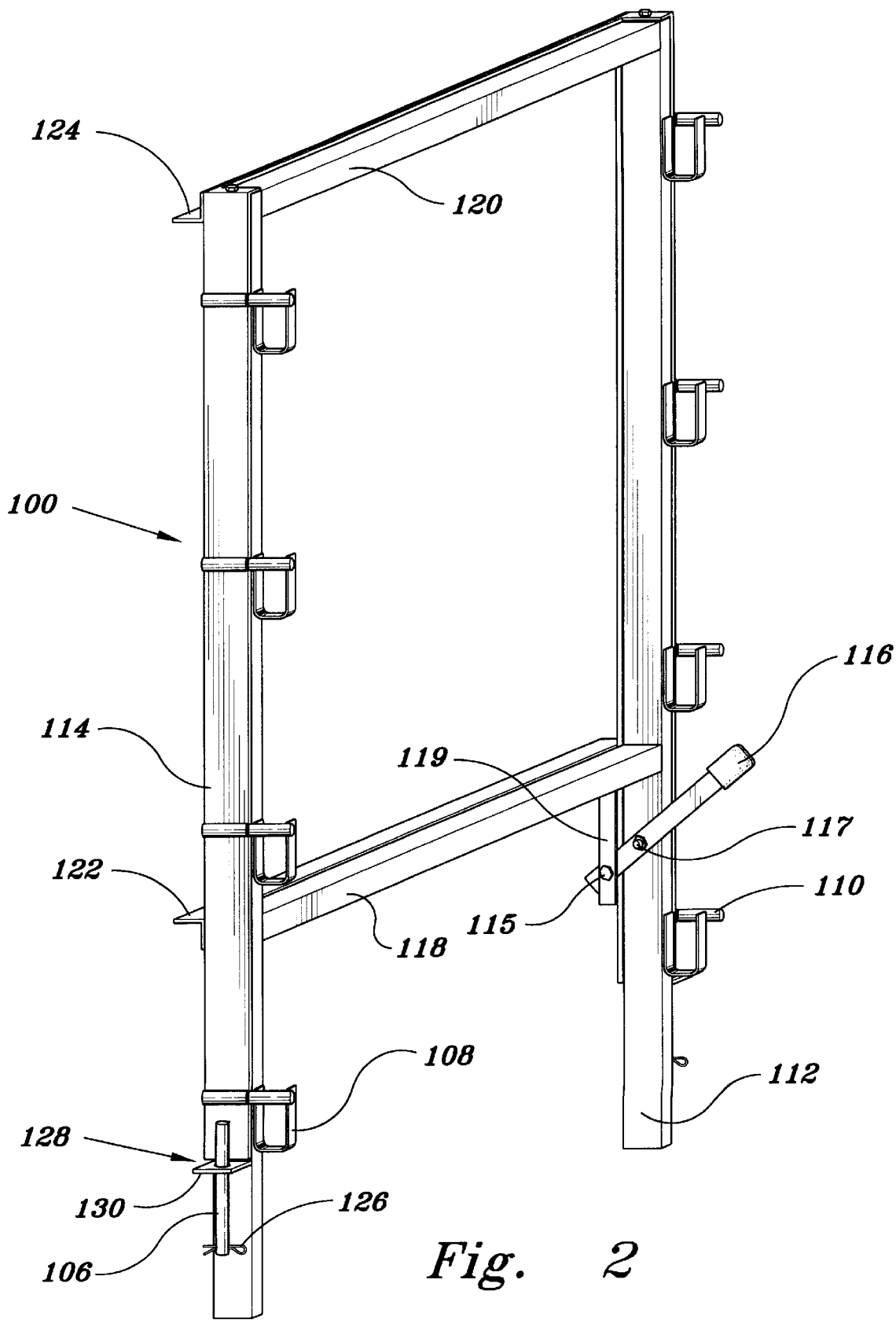
FIG. 2 is a side view of an empty multi-weeder rack according to the present invention.

FIG. 2 is a side view of an empty multi-weeder rack 100 showing the structural features of the rack 100. The handle mechanism 116 is shown in the closed position. As can be seen in FIG. 2, the multi-weeder rack 100 of the present invention has a rectangular frame comprising a stationary inner frame 112 and a vertically movable outer frame 114. Symmetrically disposed on the stationary inner frame are paired storage hooks 108 onto which weedeaters 104 are stored, for example, a weedeater 104 is stored on a pair of hooks 108 that are vertically disposed at the same height as depicted in FIG. 1.

Symmetrically disposed on the outer vertically movable frame are paired locking rods 110 that are used to secure the weedeaters 104 within their respective pair of hooks 108 as shown in FIG. 1. The stationary inner frame 112 has a pair of horizontally disposed braces (118,120) that stabilize the structure 100. The outer vertically movable frame 114 also has a pair of horizontally disposed braces (122,124) that provide structural integrity to the movable outer frame 114. In addition, the lower horizontal brace 122 of the outer frame 114 is a part of the opening and closing mechanism of the multi-weeder rack 100.

Figure 3A:
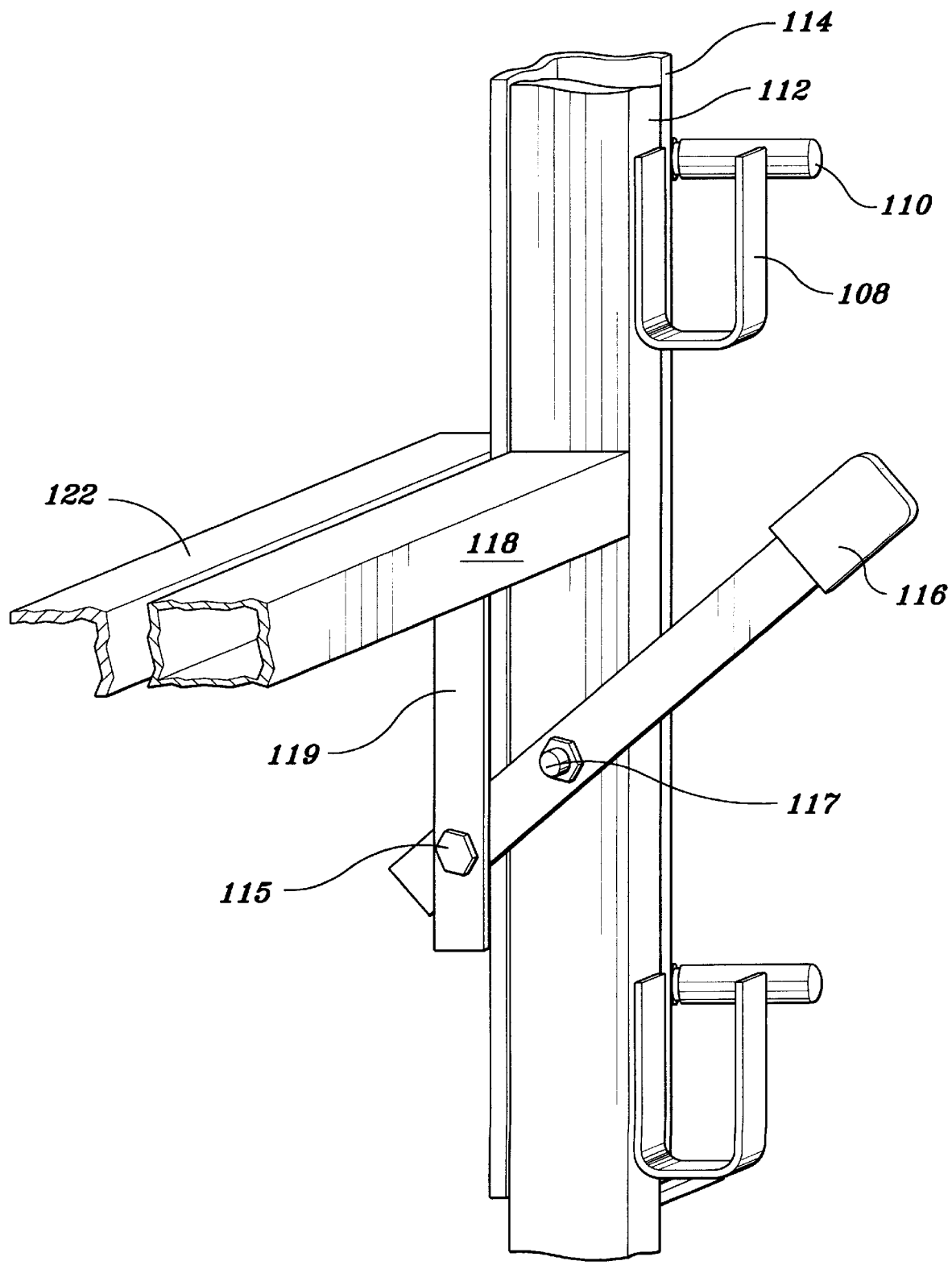
FIG. 3A is a perspective view of the handle of the multi-weeder rack in the closed position according to the present invention.
Figure 6:
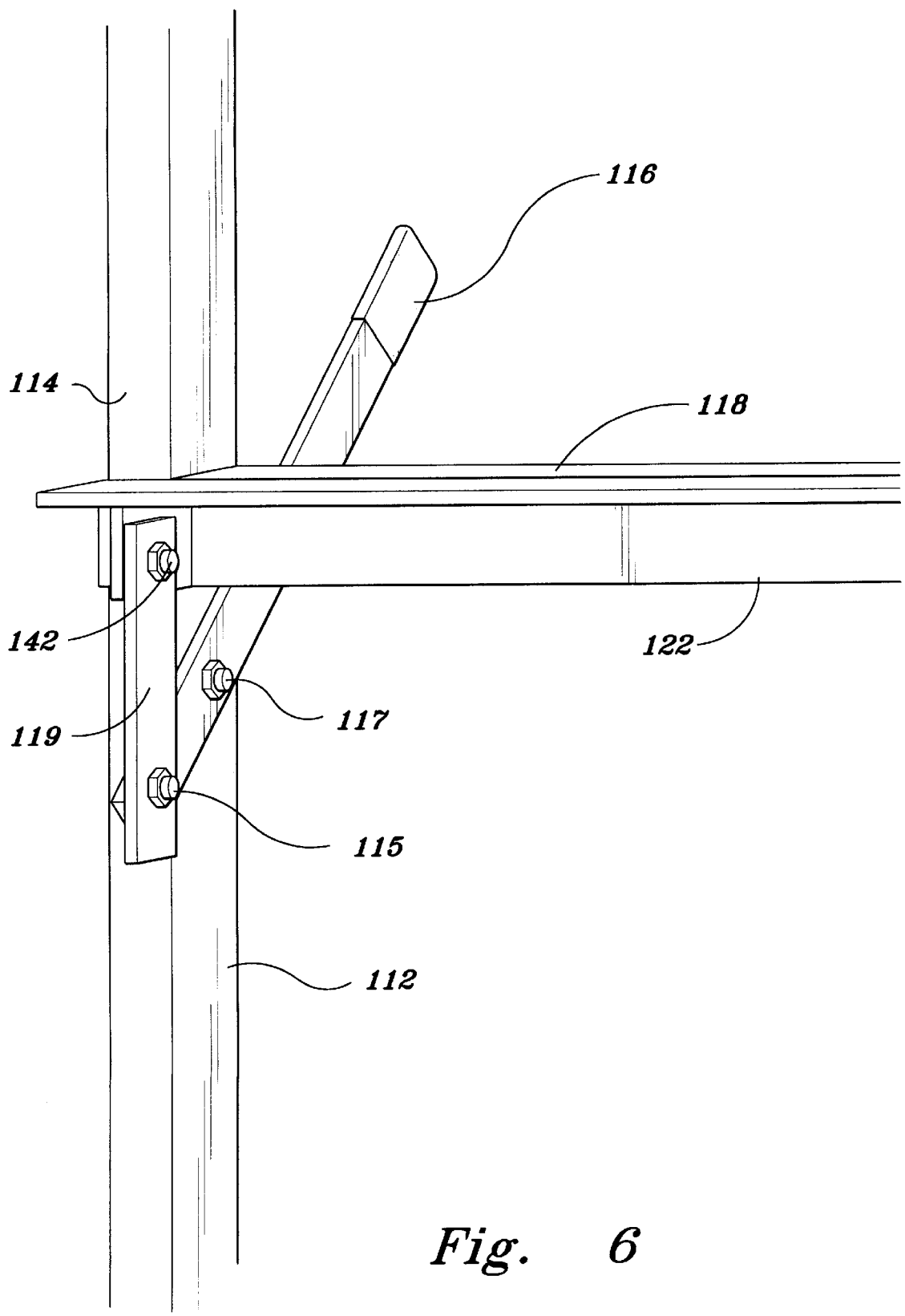
FIG. 6 is a perspective view of the handle mechanism of the multi-weeder rack showing the point of attachment of the linkage segment to the lower brace of the movable outer frame according to the present invention.

FIG. 3A is a perspective view of the handle 116 of the multi-weeder rack 100 in the closed position. The handle 116 pivots around its point of attachment 117 to the stationary inner frame 112. The handle 116 is attached via a connecting means 115 to a linkage segment 119 that is connected to the lower brace 122 of the movable outer frame 114 by a bolt 142 as depicted in FIG. 6. The handle-linkage segment-brace (116,119,122) arrangement forms the opening/closing mechanism of the multi-weeder rack 100.

Figure 3B:
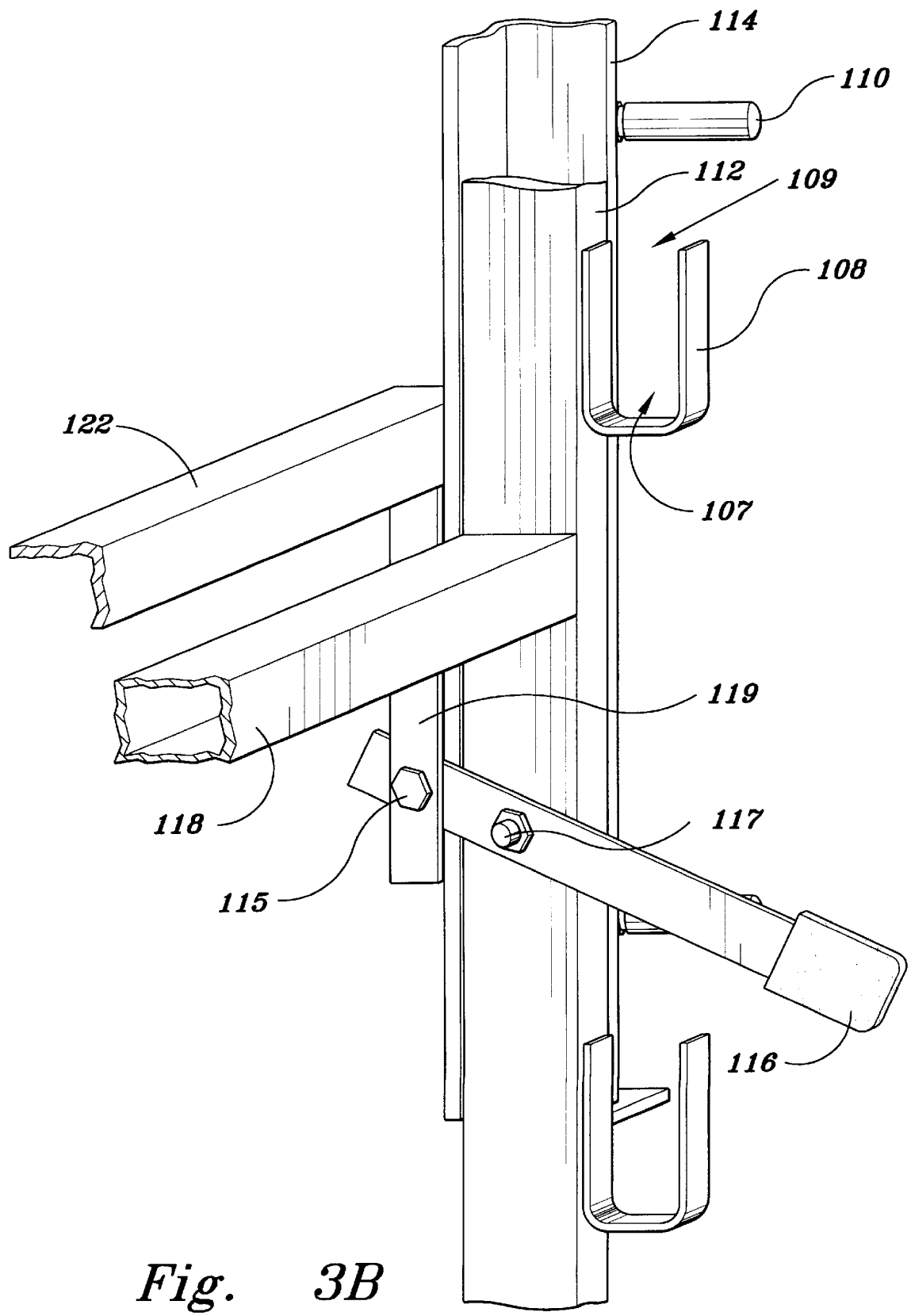
FIG. 3B is a perspective view of the handle of the multi-weeder rack in the open position according to the present invention.

FIG. 3B is a perspective view of the handle 116 of the multi-weeder rack 100 in the open position. Pushing the handle 116 downward causes the linkage segment 119 to move upward which in turn causes the lower brace 122 of the movable outer frame 114 to move upwards which causes the entire outer frame 114 to move upwards. This upward movement of the outer frame 114 lifts the locking rods 110 away from the mouth 109 of the hooks 108 thereby making the interior 107 of the hooks 108 accessible.

Figure 4A:
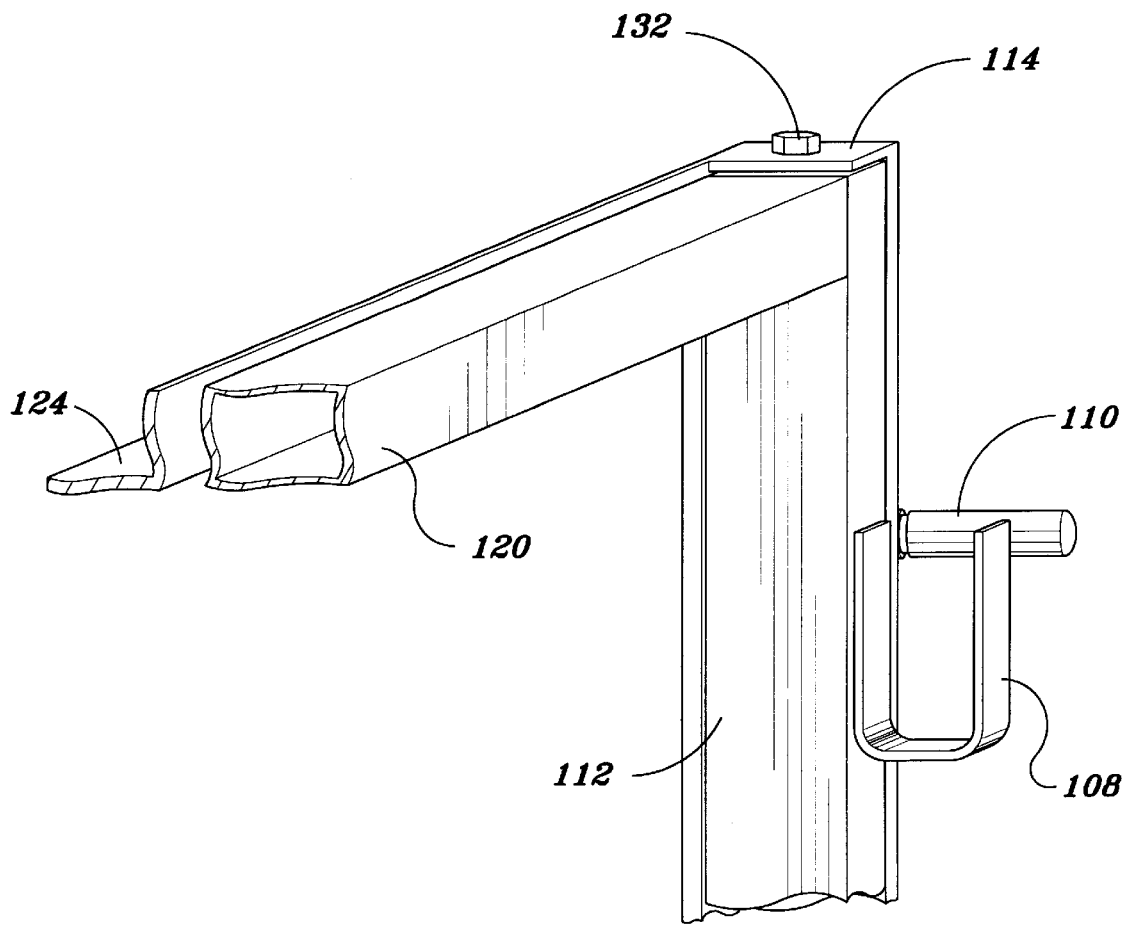
FIG. 4A is a perspective view of an upper corner of the multi-weeder rack with the slide down (closed) according to the present invention.
Figure 4B:
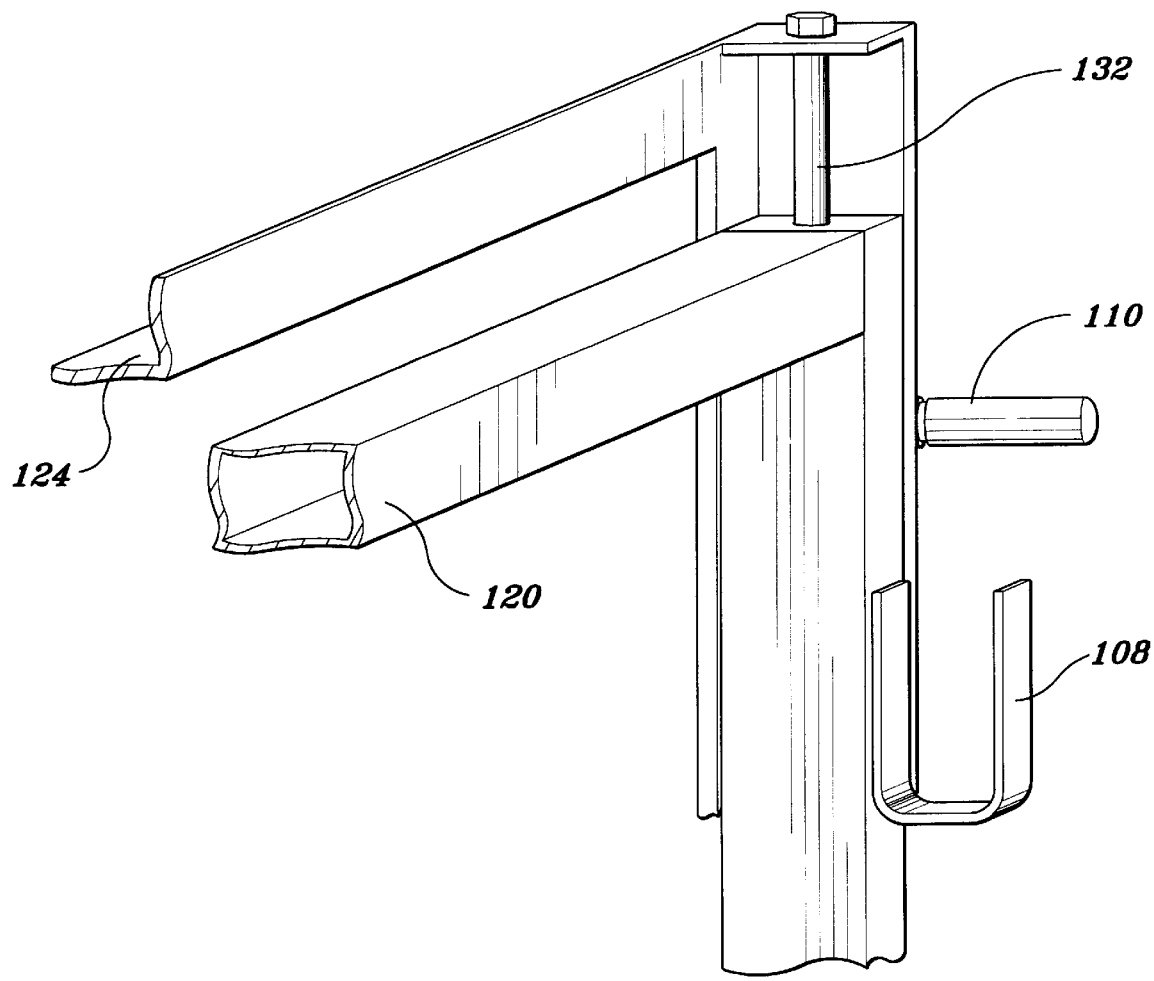
FIG. 4B is a perspective view of an upper corner of the multi-weeder rack with the slide up according to the present invention.

FIG. 4A is a perspective view of an upper corner of the multi-weeder rack 100 with the slide 114 down (closed) and FIG. 4B is a perspective view of an upper corner of the multi-weeder rack 100 with the slide 114 up. Security pins 132 disposed in the upper corners of the rack 100 and security pins 106 disposed near the base of the rack 100 ensure that the movable outer frame or slide 114 cannot be accidentally or intentionally removed from the stationary inner frame 112. The bottom security pins 106 are welded to the movable outer frame 114 and pass through an opening 128 in a square horizontally disposed protrusion 130 in the stationary inner frame 112. A configured metal piece 126 forms a portion of the security pin 106.

Figure 5:
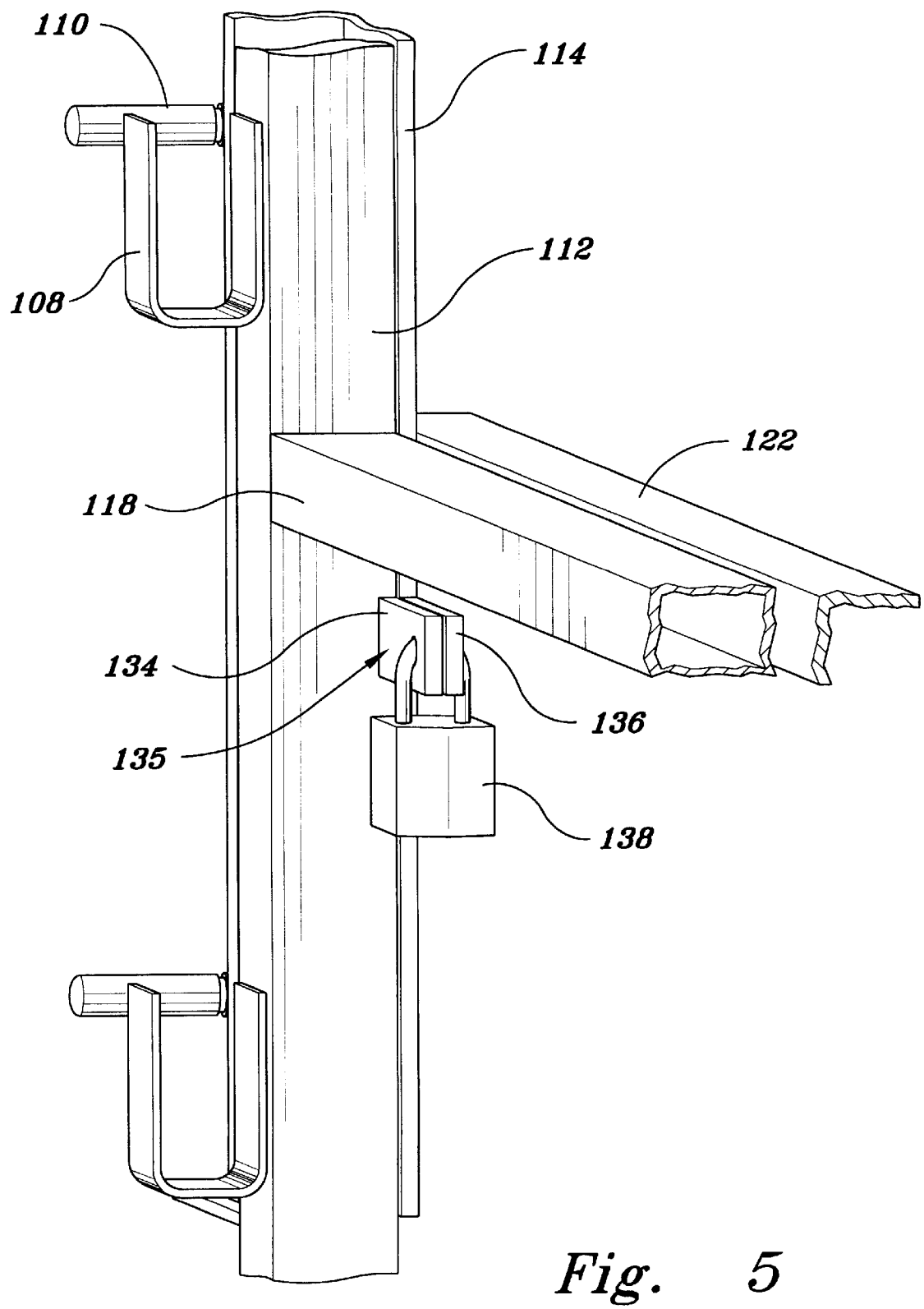
FIG. 5 is a perspective view of the portion of the multi-weeder rack where a padlock is placed to secure the contents of the rack according to the present invention.

FIG. 5 is a perspective view of the location on the multi-weeder rack 100 where a padlock 138 is placed to secure the contents of the rack 100. The multi-weeder rack 100 has two interiorly and vertically disposed square protrusions (134,136). Each square protrusion (134,136) has an opening 135. One square protrusion 134 is on the inner frame 112 and the second square protrusion 136 on the outer frame 114 and when the square protrusions (134,136) are aligned, they allow for the installation of a padlock 138 which prevents the multi-weeder rack 100 from being opened by the handle mechanism.

In a preferred embodiment, the multi-weeder rack 100 stands 60 ¼ inches, and 32 inches. The locking rods 110 are 12 inches on center with the uppermost locking rod 110 being disposed 6 inches from the top brace 124. The spacing between the upper brace 124 and the lower brace 122 is 32 ½ inches. The stationary inner frame 112 is made from 1¼" square steel tubing, the vertically movable outer frame 114 is made from 1½"×1½"×⅛" steel angle iron, the horizontal braces (122,124) are from 1½"×1½"×⅛" steel angle iron, the hooks 108 are made from ¾"× 3/16" steel with a 2" depth and 3" height and have a rubber lining, the handle 116 is from made ¼"×1½"×11½" steel and has a black vinyl grip, and the locking rods 110 are made from ½"×4× round steel rods. The top security pins 132 are made from ½"×6" round steel rods and the bottom security pins are made from ½"×6" round steel rods. The total weight of the multi-weeder rack 100 is approximately 47 lbs.

The single lock, single handle access multi-weeder rack of the present invention can be made from any suitable material or materials and can have any suitable dimensions. The multi-weeder rack of the present invention makes it easy and convenient to store and secure lawn maintenance equipment.

The preferred embodiments of the present invention disclosed herein are intended to be illustrative only and are not intended to limit the scope of the invention. It should be understood by those skilled in the art that various modifications and adaptations of the present invention as well as alternative embodiments of the present invention may be contemplated. It is to be understood that the present invention is not limited to the embodiments described above, but encompasses any and all embodiments within the scope of the following claims.

I claim:

1. A rack adapted to be rigidly disposed on a vehicle for storing a plurality weed cutting devices and for preventing unauthorized removal of the weed cutting devices, said rack comprising:

a stationary inner frame having first and second vertical members, an upper horizontal brace and a lower horizontal brace;

said first and said second vertical members each having a top and a bottom;

said upper horizontal brace being rigidly attached between said top of said first vertical member and said top of said second vertical member;

said lower horizontal brace being rigidly attached between said first vertical member and said second vertical member intermediate of said top and said bottom of each said first and said second vertical members;

said first and said second vertical members each having a plurality of hooks, said hooks being arranged in pairs, wherein a first hook of each said pair of hooks being fixedly disposed on said first vertical member, and a second hook of each said pair of hooks being fixedly disposed on said second vertical member, said pairs of hooks being equidistantly space along said first and said second vertical members;

a movable outer frame slidably engaging said stationary inner frame between an opened position and a closed position, said movable outer frame having first and second vertical members, an upper horizontal brace and a lower horizontal brace;

each said first and second vertical members having a top and a bottom;

said upper horizontal brace being rigidly attached between said top of said first vertical member and said top of said second vertical member;

said lower horizontal brace being rigidly attached between said bottom of said first vertical member and said bottom of said second vertical member;

said first and said second vertical members each having a plurality of rods, said rods being arranged in pairs, wherein a first rod of each said pair of rods being fixedly disposed on said first vertical member, and a second rod of each said pair of rods being fixedly disposed on said second vertical member, said pairs of rods being equidistantly space along said first and said second vertical members and adjacent to said pairs of hooks of said stationary inner frame;

means for selectively moving said movable outer frame between said opened position and said closed position;

a first upper security pin rigidly attached to said top of said first member of said movable outer frame, wherein said first upper security pin being vertically movable within said top of said first member of said stationary inner frame, said top of said first member of said stationary inner frame preventing any substantial horizontal movement of said first upper security pin;

a second upper security pin rigidly attached to said top of said second member of said movable outer frame, wherein said second upper security pin being vertically movable within said top of said second member of said stationary inner frame, said top of said second member of said stationary inner frame preventing any substantial horizontal movement of said second upper security pin;

a first lower security pin rigidly attached to said bottom of said first member of said movable outer frame, wherein said first lower security pin being vertically movable within said bottom of said first member of said stationary inner frame, said bottom of said first member of said stationary inner frame including means for preventing any substantial horizontal movement of said first lower security pin;

a second lower security pin rigidly attached to said bottom of said second member of said movable outer frame, wherein said second lower security pin being vertically movable within said bottom of said second member of said stationary inner frame, said bottom of said second member of said stationary inner frame including means for preventing any substantial horizontal movement of said second lower security pin; and means for securing said movable outer frame to said stationary inner frame when said movable outer frame is in said closed position, whereby unauthorized access to weed cutting devices stored therein is prevented.

2. The rack according to claim 1 wherein said means for securing said movable outer frame to said stationary inner frame when said movable outer frame is in said closed position including a first interiorly and vertically disposed protrusion having an opening disposed on said movable outer frame, a second interiorly and vertically disposed protrusion with an opening disposed on said stationary inner frame, whereby upon aligning said openings in said first and said second protrusions provides an attachment location for installing a padlock.

3. The rack according to claim 1 wherein said means for selectively moving said movable outer frame between said opened position and said closed position including a handle and a linkage segment;

said handle having a gripping end, an intermediate portion and a connecting end, said intermediate portion being pivotally attached to said second vertical member of said stationary inner frame;

said linkage segment having a first end and second end, said second end being fixedly attached to said lower horizontal brace of said movable outer frame, and said connecting end of said handle being pivotally coupled to said second end of said linkage segment;

wherein said movable outer frame moves upwardly to said opened position when said handle is pushed downwardly and said movable outer frame moves downwardly to said closed position when said handle is pushed upwardly.

* * * * *